United States Patent
Tanaka

[19]

[11] Patent Number: 5,820,094
[45] Date of Patent: Oct. 13, 1998

[54] CUP HOLDING DEVICE WITH A GUIDE FOR GUIDING CUP HOLDERS

[75] Inventor: Tsutomu Tanaka, Tochigi-ken, Japan

[73] Assignee: Nifco Inc., Yokohama, Japan

[21] Appl. No.: 802,678

[22] Filed: Feb. 19, 1997

[30] Foreign Application Priority Data

Feb. 19, 1996 [JP] Japan .................................. 8-053686

[51] Int. Cl.⁶ .................................................. A47K 1/09
[52] U.S. Cl. ...................... 248/311.2; 224/926; 224/282
[58] Field of Search ............................ 248/311.2, 309.1,
248/315, 314, 289.11, 289.31; 224/926,
281, 282, 483, 553; 296/37.12; 211/71.01,
85; 297/188.16, 188.19

[56] References Cited

U.S. PATENT DOCUMENTS

| | | | |
|---|---|---|---|
| 2,649,270 | 8/1953 | Franks .................................. | 248/311.2 |
| 4,953,771 | 9/1990 | Fischer et al. .................... | 248/311.2 X |
| 5,104,184 | 4/1992 | Kwasnik et al. .................. | 248/311.2 X |
| 5,190,259 | 3/1993 | Okazaki .............................. | 248/311.2 |
| 5,628,486 | 5/1997 | Rossman et al. ............... | 297/188.19 X |
| 5,671,877 | 9/1997 | Yabuya ............................. | 248/311.2 X |

OTHER PUBLICATIONS

Japanese Unexamined Utility Model Application No. 4–107129, Sep. 1992.

*Primary Examiner*—Leslie A. Braun
*Assistant Examiner*—Stephen S. Wentsler
*Attorney, Agent, or Firm*—Kanesaka & Takeuchi

[57] ABSTRACT

A cup holding device is designed to hold cups therein, and is formed of a case having a storing portion therein; a rotating member rotationally supported by the case and rotating between a storing position for closing the storing portion and a using position; two cup holders axially supported by the rotating member to be rotatable in a direction perpendicular to a rotating direction of the rotating member and having holding portions for the cups; a guided portion provided at at least one of the two cup holders; a guiding device formed in the case for guiding the guided portion; a first urging member for urging the rotating member to rotate from the storing position to the using position; and a holding member for holding the rotating member at the storing position. When the rotating member is rotated from the storing position to the using position by releasing the holding member, the guided portion is guided by the guiding device and the holding portions of the two cup holders overlapped one upon the other in the storing position are separated. In the cup holding device, number of parts for constituting the cup holding device is reduced and the cup holding device can be produced at a low cost.

11 Claims, 4 Drawing Sheets

CUP HOLDING DEVICE WITH A GUIDE FOR GUIDING CUP HOLDERS

BACKGROUND OF THE INVENTION AND RELATED ART STATEMENT

The invention relates to a cup holding device, more particularly a cup holding device for holding cups containing beverage or the like not to fall down, which is fixed to a center console of, for example, a car.

In a conventional cup holding device, for example, as disclosed in Japanese Utility Model Publication (KOKAI) No. 4-107129, a base portion constitutes a storing portion, wherein one end of a pair of links is pivotally provided to a lid attached to the base portion, and the other end of the pair of links is pivotally provided to supporting points spaced apart from each other of cup holders. The cup holders are stored in a storing portion or taken out therefrom according to opening or closing of the lid. In the above cup holding device, there is used a link mechanism such that the cup holders function as an intermediate link, and the cup holders are moved vertically with respect to the base.

In the conventional cup holding device, centers for holding the two cup holders are separated by using a pivotal attachment of one of the supporting points, so that the cup holders are made compact when stored in the storing portion.

In the conventional cup holding device, however, since the link mechanism is used, number of parts for constituting the cup holding device is increased, which results in a high cost.

The present invention has been made to solve the above defects, and an object of the invention is to provide a cup holding device, wherein number of parts for constituting the cup holding device is reduced.

Another object of the present invention is to provide a cup holding device as stated above, which can be easily produced.

Further objects and advantages of the invention will be apparent from the following description of the invention.

SUMMARY OF THE INVENTION

A cup holding device of the invent-ion is formed of a case having a storing portion with a bottom; a rotating or rotatable member rotationally supported by the case and having a rotation side; and two cup holders axially supported by the rotating member to be rotatable in a direction perpendicular to a rotating direction of the rotating member. The rotating member rotates between a storing position where the rotation side is located close to the bottom of the storing portion and a using position where the rotation side is located away from the bottom of the storing portion. Each of the two cup holders has a holding portion at one end such that when the rotating member is positioned at the storing position, the two cup holders are at least partially overlapped one upon the other.

The cup holding device further includes a guided portion provided at the other end in at least one of the two cup holders; a guiding device formed in the case for guiding the guided portion; a first urging member attached to the rotating member for urging the rotating member to rotate from the storing position to the using position; and a holding member for holding the rotating member at the storing position. When the rotating member is rotated from the storing position to the using position by releasing the holding member, the guided portion is guided by the guiding device and the holding portions of the two cup holders overlapped one upon the other are separated from each other.

In the invention, the guiding device for guiding the guided portion provided at one of the cup holders includes a cam surface provided in the storing portion, and a second urging member provided between the two cup holders. The cam surface is inclined to position at least one of the holding portions to a central side when the rotating member is positioned at the storing position so that the two cup holders are overlapped one upon the other, and to position at least one of the holding portions to an outer side when the rotating member is positioned at the using position. The second urging member urges the guided portion to contact the cam surface as well as urges the two holding portions to separate from each other.

In the invention, the cup holding device may further include a lid for opening and closing the storing portion. The lid is supported by the case to rotate similar to the rotating member, and has a supporting point spaced apart from a supporting point of the rotating member with a predetermined distance therebetween. The holding member holds the lid to close the storing portion. The lid covers the storing portion in the storing position, and supports the cups in the using position.

DETAILED DESCRIPTION OF A PREFERRED EMBODIMENTS

Figure 1:
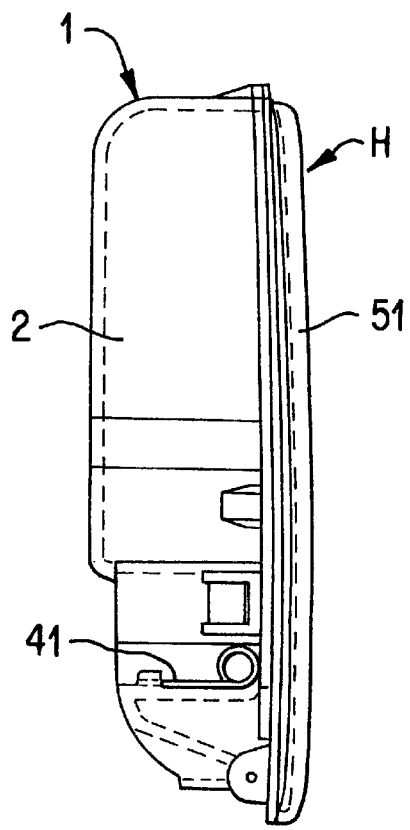
FIG. 1 is a left side view of a cup holding device in a state where cup holders are stored by closing a lid, according to an embodiment of the present invention.

Referring to the drawings, an embodiment of the present invention is described hereunder.

In the drawings, H represents a cup holding device of the invention; B represents an attaching member for receiving the cup holding device H, such as a center console of a car; and C indicates a cover. The cover C may be formed integrally with the cup holding device H, or may be formed separately. The cover C covers an area around the cup holding device H attached to the attaching member B. U represents a cup.

Figure 2:
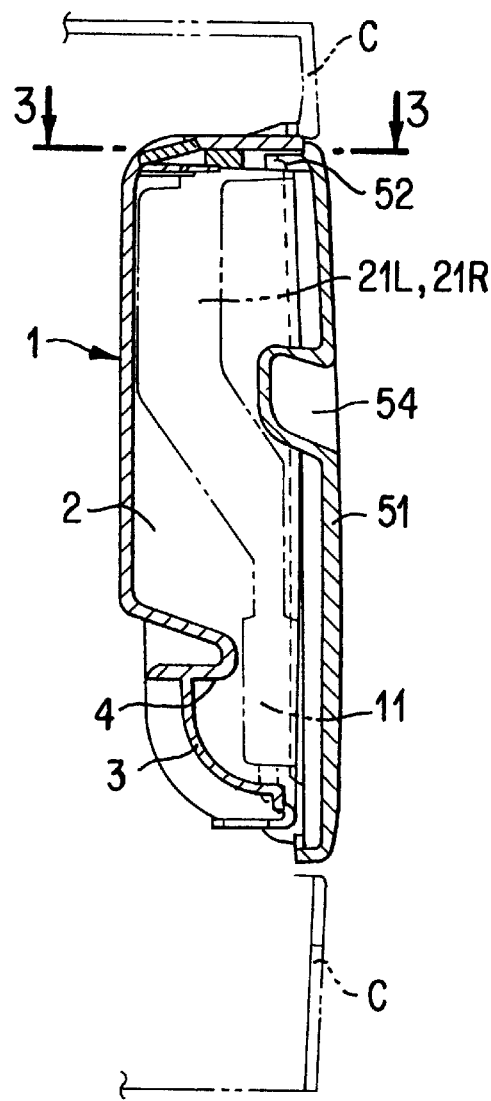
FIG. 2 is a left side sectional view taken at a center portion of FIG. 1, wherein a rotating member and the cup holders are shown by two-dot-dash lines.
Figure 3:
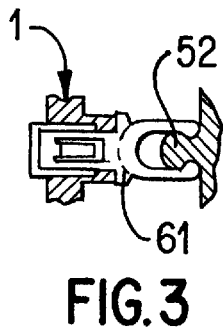
FIG. 3 is a plan view for showing a holding member, taken along a line 3—3 in FIG. 2.
Figure 4:
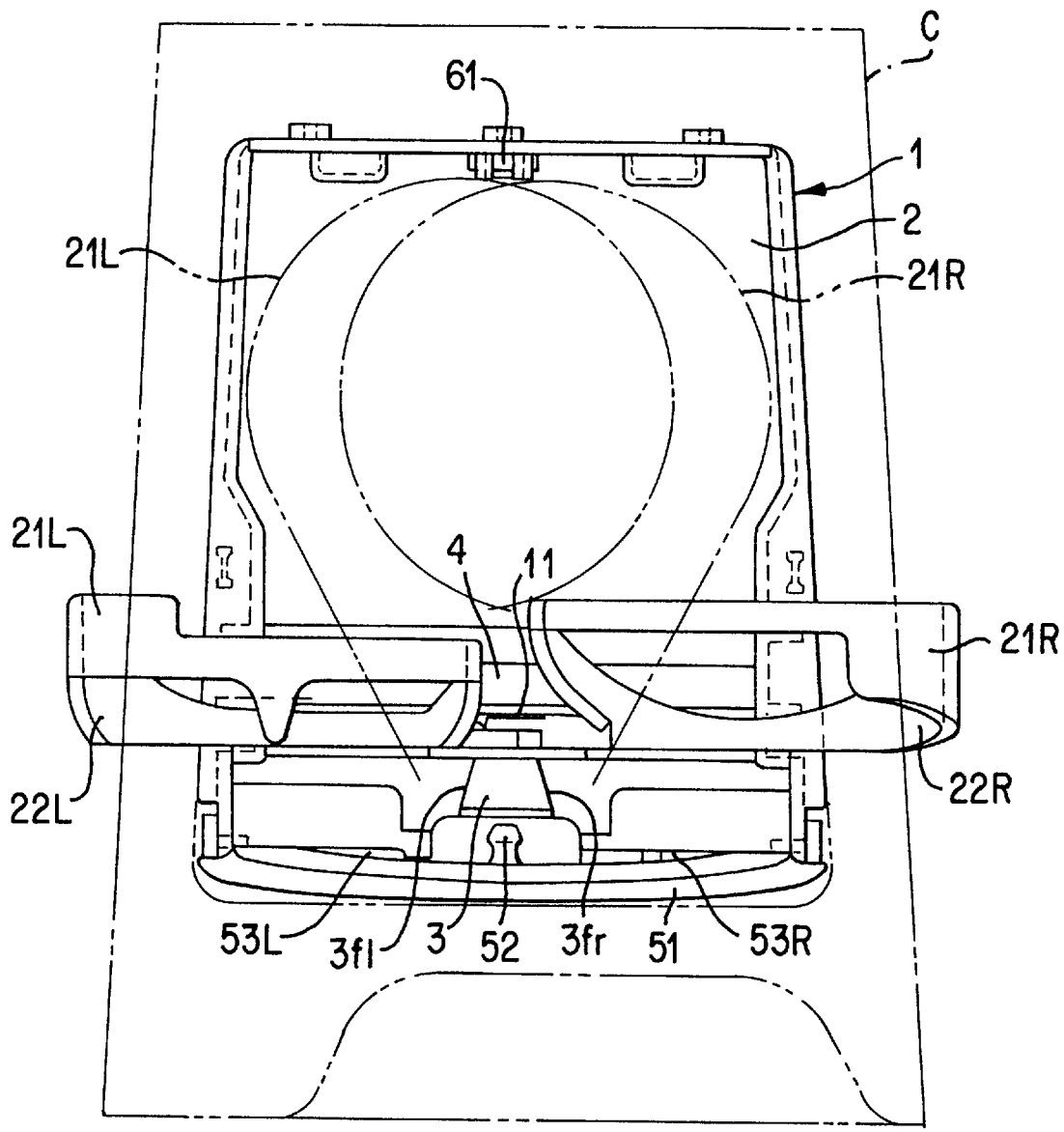
FIG. 4 is a front view in a state where the lid is opened so that the cup holders can be used.
Figure 5:
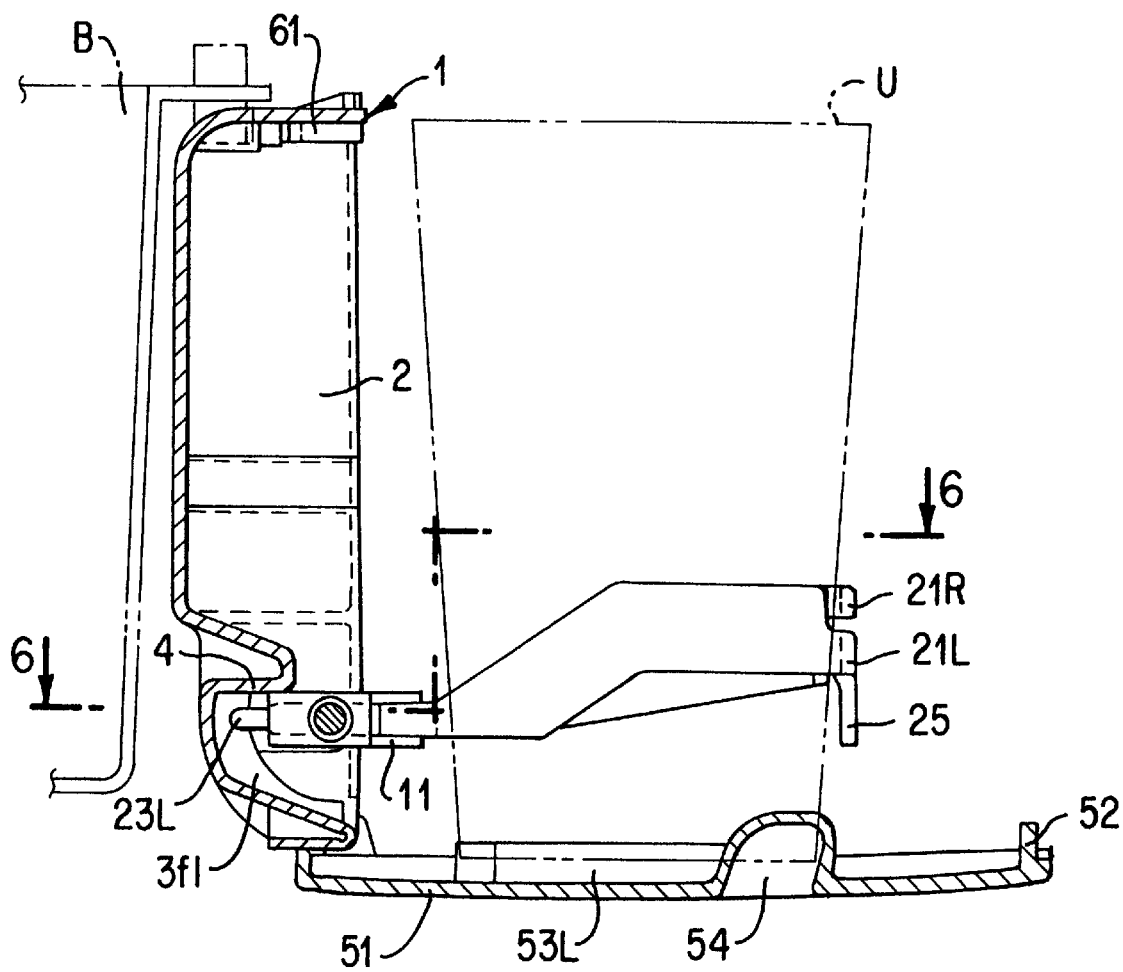
FIG. 5 is a left side view with a partial section in FIG. 4, which is a sectional view taken along a line 5—5 in FIG. 6.

Incidentally, the attaching member B and the cup U are only shown in FIG. 5, and the cover C is only shown in FIGS. 2 and 4.

Figure 7:
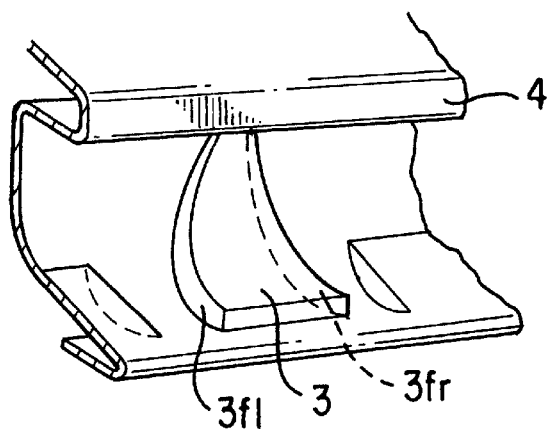
FIG. 7 is a partially enlarged perspective view for showing cam surfaces.

Reference numeral 1 represents a case, and the case includes a rectangular storing portion 2; a cam 3 for constituting a guide device having two inclined cam surfaces 3fl, 3fr tapering from a lower side to an upper side, as shown in FIG. 7, the cam 3 being provided at a central lower end portion of the storing portion 2; and a step portion 4 for constituting a stopper extending in a lateral direction and continuing to the cam 3.

Reference numeral 11 denotes a rotating or rotatable member. The rotating member 11 is rotationally supported in a vertical direction by a side wall of the case 1 at a side lower than the step portion 4. When the rotating member 11 is rotated to a using position, as shown in FIG. 5, a portion of the rotating member 11 abuts against the step portion 4.

Reference numerals 21L, 21R show cup holders. The cup holders are rotatably supported by the rotating member 11 in a direction orthogonal to the rotating direction of the rotating member 11. The cup holders 21L, 21R include holding holes 22L, 22R as holding portions at the respective ends, and projecting rods 23L, 23R formed at the other ends relative to the shaft supporting portions, which function as guided portions by slidingly contacting the cam surfaces 3fl, 3fr.

The cup holder 21L is provided with a boss 24 for constituting a guide device at a right side portion between the shaft supporting portion and the holding hole 22L, and a projecting portion 25 for pushing an inner side of a lid 51 or being pushed by the inner side of the lid 51, which will be described later.

Also, the cup holder 21R is provided with an engaging groove 26 for constituting a guide device, which is provided at a left side portion between the shaft supporting portion and the holding hole 22R. The boss 24 of the cup holder 21L engages the engaging groove 26 to rotate the cup holder 21R.

Incidentally, in the respective cup holders 21L, 21R, as shown in FIG. 4, the cup holer 21L located at a left side is cut off at a right upper side thereof, while the cup holder 21R located at a right side is cut off at a left lower side thereof, so that the respective portions of the two cup holders 21L, 21R are overlapped one upon the other to thereby narrow the width in a lateral direction.

Reference numeral 31 shows a torsion spring as a second urging member for constituting a guide device. The torsion spring is disposed between the two cup holders 21L and 21R to separate the holding holes 22L, 22R from each other and to urge the projection rods 23L, 23R to have pressure contact with the corresponding cam surfaces 3fl, 3fr.

Figure 6:
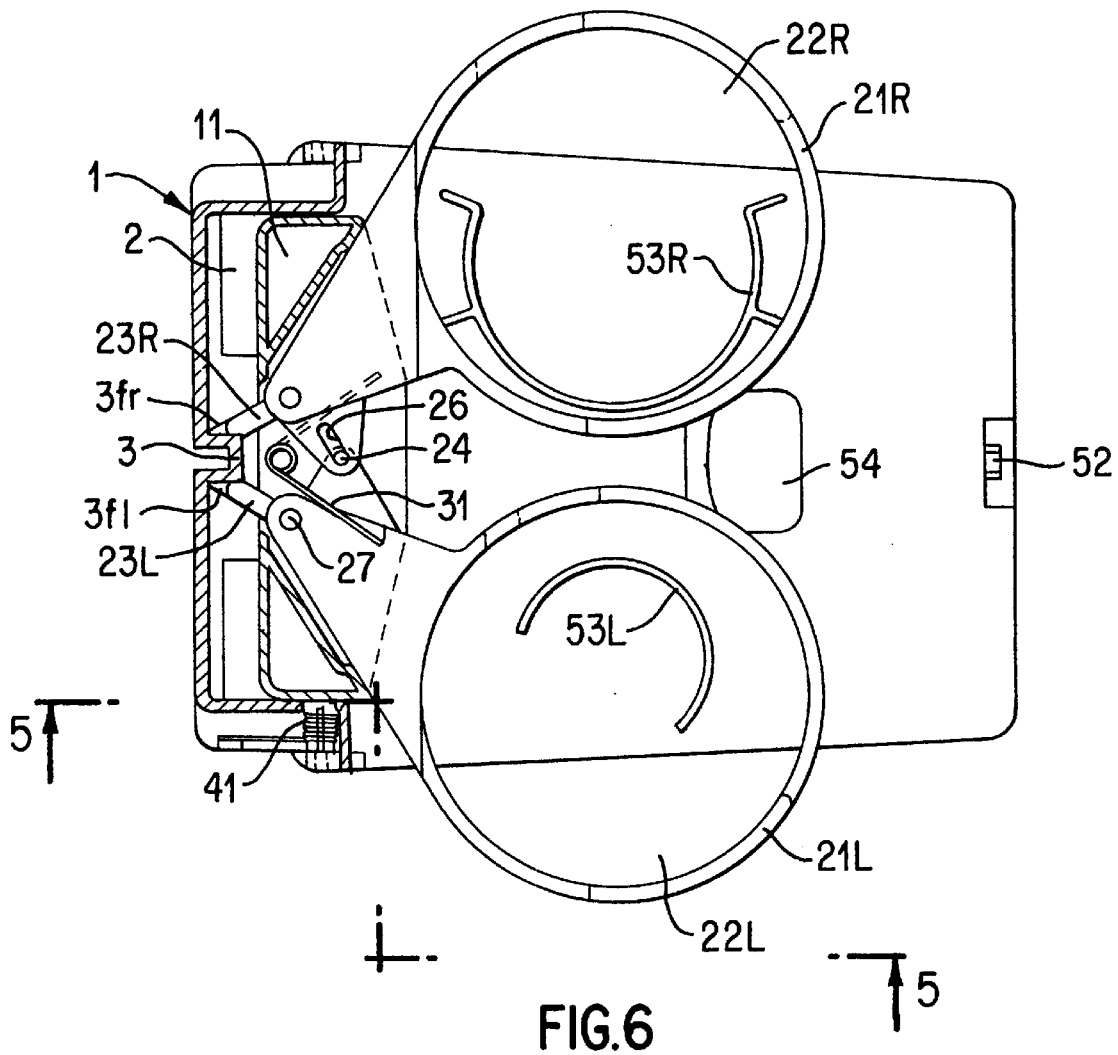
FIG. 6 is a sectional view taken along a line 6—6 in FIG. 5.

Reference numeral 41 represents a torsion spring as a first urging member. The torsion spring is disposed between the case 1 and a shaft of the rotating member 11 so that the rotating member 11 at the storing position as shown in FIG. 2 is rotated to the using position as shown in FIGS. 4 through 6 to thereby allow a portion of the rotating member 11 to abut against the step portion 4.

The lid 51 is rotatably supported at a lower portion of the case 1, and includes an engaging portion 52 at a central portion of a rotating edge thereof; circular receiving or supporting ribs 53L, 53R at portions under the cup holders 21L, 21R in the using state, which engage the lower side circumferential edges of the cups U from an inside by abutting against the bottoms of the cups U; and a handle 54 dented inwardly.

Reference numeral 61 represents a push-push type latch as a holding device. The latch 61 is attached to a central portion of an upper side of the storing portion 2 of the case 1 to hold the engaging portion 52 in a state where the lid 51 is held to close the storing portion 2.

Next, an operation of the invention is described.

First, as shown in FIGS. 1 and 2, in a state where the engaging portion 52 is held by the latch 61 to close the storing portion 2 of the case 1 by the lid 51, since the projecting rods 23L, 23R of the cup holders 21L, 21R forcibly contact the lower end sides of the corresponding cam surfaces 3fl, 3fr by an urging force of the torsion spring 31, the two cup holders 21L, 21R are stored in the storing portion 2 in a state where the two cup holders 21L, 21R are partially overlapped one upon the other, as shown by two-dot-dash lines in FIGS. 2 and 4. Thus, the width in a lateral direction becomes narrower, and the rotating member 11 and the cup holders 21L, 21R are positioned in their storing positions.

Under the condition, since the rotating member 11 is urged to rotate to the using position by the torsion spring 41, the projecting portion 25 of the cup holder 21L abuts against an inner side of the lid 51.

When the latch 61 is released by pushing an upper edge of the lid 51, the lid 51 becomes rotatable and is pushed by the projecting portion 25 of the cup holder 21L. Then, the lid 51 can be rotated to open the storing portion 2 by lightly rotating the lid 51 with a finger, as shown in FIGS. 4 to 6.

In the invention, the rotating member 11 is urged to rotate to the using position by the torsion spring 41; the two projecting rods 23L, 23R are urged to contact the corresponding cam surfaces 3fl, 3fr by the torsion spring 31 with a pressure; the two cam surfaces 3fl, 3fr are inclined to be tapered from the lower side toward the upper side; and the boss 24 can move in the engaging groove 26. Therefore, as the rotating member 11 comes close to the using position while the two projecting rods 23L, 23R are guided along the corresponding cam surfaces 3fl, 3fr, the two cup holders 21L, 21R are gradually separated from each other. When the rotating member 11 reaches the using position where a portion of the rotating member 11 strongly abuts against the step portion 4, the two cup holders 21L, 21R are separated from each other, and the supporting ribs 53L, 53R of the lid 51 are located below the holding holes 22L, 22R to thereby assume the using position, as shown in FIGS. 4 to 6.

Accordingly, as shown in FIG. 5, when the lower portions of the cups U are inserted into the respective holding holes 22L, 22R from the upper sides of the cup holders 21L, 21R and bottom portions of the cups U are positioned on the supporting ribs 53L, 53R so that the cups U are positioned on the lid 51, the supporting ribs 53L, 53R are respectively located inside the lower circumferential sides of the cups U to thereby support the two cups U not to fall down by the cup holding device H.

Next, an operation for storing the rotating member 11 and the cup holders 21L, 21R in the storing portion 2 by closing the lid 51 is explained.

When the lid 51 is rotated in a counterclockwise direction in FIG. 5, since the lid 51 pushes the projecting portion 25 with its inner surface, the rotating member 11 is rotated in the counterclockwise direction against the urging force of the torsion spring 41, and the two cup holders 21L, 21R are rotated in the counterclockwise direction against the urging force of the torsion spring 31. Also, the two projecting rods 23L, 23R are guided by the corresponding cam surfaces 3fl, 3fr against the urging force of the torsion spring 31, and the boss 24 moves in the engaging groove 26 while pushing and rotating the cup holder 21R. Since the two cam surfaces 3fl, 3fr are enlarged toward the lower side, as the lid 51 is closed, the two cup holders 21L, 21R gradually approach with each other to thereby partially overlap one upon the other. As a result, the width of the two cup holders 21L, 21R becomes narrower than the width of the storing portion 2, as shown by two-dot-dash lines in FIG. 4.

Then, when the engaging portion 52 is held by the latch 61, the rotating member 11 and the cup holders 21L, 21R assume the storing state as shown in FIGS. 1 and 2.

As described hereinabove, according to the embodiment of the present invention, the rotating member 11 supported by the case 1 having the cam surfaces 3fl, 3fr and the step portion 4 in the storing portion 2 is urged to rotate to the using position by the torsion spring 41; the two cup holders 21L, 21R supported by the rotating member 11 are provided with the holding holes 22L, 22R and the projecting rods 23L, 23R; the two cup holders 21L, 21R are urged by the torsion spring 31 so that the projecting rods 23L, 23R contact the cam surfaces 3fl, 3fr with a pressure; and the lid 51 for closing the storing portion 2 is supported by the latch 61. Thus, number of parts for constituting the cup holding device is reduced, and the cup holding device can be produced at a low cost.

Also, since the projecting rods 23L, 23R contact the cam surfaces 3fl, 3fr with a pressure by the urging force of the torsion spring 31, the two cup holders 21L, 21R do not wobble or shake in a width direction.

Further, since the projecting rods 23L, 23R are guided by the cam surfaces 3fl, 3fr, the cup holders 21L, 21R can rotate smoothly.

Furthermore, as the lid 51 is provided, the storing portion 2 in the storing state is covered by the lid 51, so that the inside of the storing portion 2 can not be seen from the outside.

Since the supporting shafts of the rotating member 11 and the lid 51 are separated, even if the height of the cup holders 21L, 21R is not high, the cups U can be sufficiently supported not to fall down, and the cup holding device H can be made thin. Also, the lid 51 can be used as a receiving or supporting member of the cups U.

Also, since the lid 51 is provided with the supporting ribs 53L, 53R, in case cans or the like having a smaller diameter than that of the holding holes 22L, 22R are disposed on the lid 51, the receiving rib 53L engages a lower end circumferential edge of the can from the inside thereof to bring the can close to a circumferential edge of the holding hole 22L, while in the receiving rib 53R, a lower end portion of the can is positioned at an inner circumferential portion of the receiving rib 53R. Thus, the can or the like having the smaller diameter can be also supported not to fall down.

Incidentally, in the above embodiment, the rotating member 11 abuts against the step portion 4 to stop at the using position. However, the projecting rods 23L, 23R may abut against the step portion 4 to stop at the using position. Also, the rotating member 11 or the projecting rods 23L, 23R may abut against a different portion to stop at the using position.

Also, in the cup holding device, the guiding device for guiding the projecting rods 23L, 23R may be formed of inclined guiding grooves tapering from a lower side toward an upper side, and the boss 24, the engaging groove 26 and the torsion spring 31 may be omitted. In this case, the cup holding device can also be operated in the same manner. If a tape or the like having a small friction resistance is attached to portions where the projecting rods 23L, 23R slidingly contact, the cup holders 21L, 21R can be more smoothly rotated.

Further, the guiding device may be formed of either projecting rod 23L or projecting rod 23R, the boss 24, the engaging groove 26 and the inclined guide groove for guiding the projecting rod 23L or the projecting rod 23R; or the guiding device may be formed of the boss 24, the engaging groove 26, the torsion spring 31, and either cam surface 3fl or cam surface 3fr for guiding the projecting rod 23L or projecting rod 23R. In both cases, the guiding device can be operated in the same manner.

Furthermore, in the cup holding device, the lid 51 may be omitted; either the rotating member 11 or one of the two cup holders 21L and 21R may be supported by a latch at the storing position; and the two cup holders 21L, 21R may have bottoms, respectively, and the two cup holders may be partially cut out to be piled one upon the other. In these cases, the cup holding device can also be operated in the same manner.

It is needless to say that in the present embodiment, the case 1 is a vertical type to be disposed in a vertical direction, but the case 1 may be a horizontal type to be disposed in a horizontal direction for attaching to a center console or the like.

As described above, a cup holding device according to the present invention is structured such that a rotating member supported by a case provided with a guiding device in a storing portion thereof is urged toward a using position by an urging member; and, a guided portion is provided to at least one of two cup holders supported by the rotating member, and the guided portion is guided by the guiding device so that the two cup holders are moved close to or away from each other, wherein when the two cup holders are positioned at a storing position, the two cup holders are partially overlapped one upon the other, and when the two cup holders are positioned at the using position, holding portions of the two cup holders are separated from each other. Therefore, in the cup holders moving in the upper and lower directions with respect to the storing portion, a space for holding the cup holders can be reduced; since a link mechanism is not necessary, number of parts for constituting the cup holding device is reduced; and the cup holding device can be made at a low cost.

Also, since the guiding device is formed of cam surfaces and a second urging member for urging the guided portion to the cam surfaces with a pressure and for urging the two cup holders so that the two holding portions are separated, the two cup holders do not wobble or shake in the width direction and are smoothly rotated.

Further, since a lid is provided and a storing portion in a storing state is covered with the lid, an inside of the storing portion in the storing state is not seen from the outside.

Furthermore, since supporting shafts of the rotating member and the lid are separated, even if the height of the two cup holders is made shorter, the cups can be sufficiently supported not to fall down. Also, the cup holding device can be made thinner, and the lid can be used as a receiving or supporting member of the cups.

While the invention has been explained with reference to the specific embodiments of the invention, the explanation is illustrative, and the invention is limited only by the appended claims.

What is claimed is:

1. A cup holding device comprising:
   a case having a storing portion with a bottom;
   a rotatable member rotationally supported by the case and having a rotation side, said rotatable member for rotating between a storing position where the rotation side is located close to the bottom of the storing portion and a using position where the rotation side is located away from the bottom of the storing portion;
   two cup holders axially supported by the rotatable member to be rotatable in a direction perpendicular to a rotating direction of the rotatable member, each of said two cup holders having a holding portion at one end such that when the rotatable member is positioned at the storing position, the two cup holders are at least partially overlapped one upon the other;

guided portions, each of the guided portions being provided at the other end of a corresponding one of each of the two cup holders;

a guiding device formed in the storing portion for guiding the guided portions, said guiding device having two cam surfaces provided in a central lower portion of the storing portion,. said cam surfaces facing away from each other and tapering upwardly;

a first urging member fixed to the rotatable member for urging the rotatable member to rotate from the storing position to the using position;

a second urging member provided between the two cup holders, said second urging member urging each of the guided portions of the two cup holders to contact with a corresponding one of the cam surfaces;

a holding member for holding the rotatable member at the storing position so that when the rotatable member is rotated from the storing position to the using position by releasing the holding member, the guided portions are guided by the guiding device and the holding portions of the two cup holders overlapped one upon the other are separated from each other; and a lid for opening and closing the storing portion, said lid being supported by the case to rotate in a direction parallel to the rotating direction of the rotatable member and having a supporting point spaced apart from a supporting point of said rotatable member wherein each of the supporting points is located at a predetermined distance away from each other, said holding member holding the lid to close the storing portion.

2. The cup holding device according to claim 1, wherein said cam surfaces of the guiding device incline to position the holding portions to central positions when the rotatable member is positioned at the storing position so that the two cup holders are overlapped one upon the other, and to position said holding portions to outer positions when the rotating member is positioned at the using position.

3. The cup holding device according to claim 2, wherein said lid has a lateral size slightly smaller than that between the holding portions in the using position, said lid being adapted to support cups held in the holding portions.

4. The cup holding device according to claim 3, wherein said holding member includes a latch attached to the case, and an engaging member fixed to the lid and engagable with the latch.

5. A cup holding device comprising:

a case having a storing portion with a bottom;

a rotatable member rotationally supported by the case and having a rotation side, said rotatable member for rotating between a storing position where the rotation side is located close to the bottom of the storing portion and a using position where the rotation side is located away from the bottom of the storing portion;

two cup holders axially supported by the rotatable member to be rotatable in a direction perpendicular to a rotating direction of the rotatable member, each of said two cup holders having a holding portion at one end such that when the rotatable member is positioned at the storing position, the two cup holders are at least partially overlapped one upon the other, and each of the two cup holders having a guided portion at the other end thereof;

a guiding device formed in the storing portion for guiding the guided portions, said guiding device having two cam surfaces provided in a central lower portion of the storing portion, said cam surfaces facing away from each other and tapering upwardly, each of said guided portions being urged to contact a corresponding one of the cam surfaces for guiding the cup holders;

a first urging member fixed to the rotatable member for urging the rotatable member to rotate from the storing position to the using position; and a holding member for holding the rotatable member at the storing position so that when the rotatable member is rotated from the storing position to the using position by releasing the holding member, each of the guided portions is guided along each of the corresponding cam surfaces and the holding portions of the two cup holders overlapped one upon the other are separated from each other.

6. The cup holding device according to claim 5, further comprising a lid for opening and closing the storing portion, said lid being supported by the case to rotate in a direction parallel to the rotating direction of the rotatable member and having a supporting point spaced apart from a supporting point of said rotatable member wherein each of the supporting points is located at a predetermined distance away from each other, said holding member holding the lid to close the storing portion.

7. The cup holding device according to claim 6, further comprising a second urging member provided between the two cup holders, said second urging member urging each of the guided portions to contact the corresponding cam surfaces and urging said holding portions to separate from each other.

8. A cup holding device comprising:

a case having a first case portion with a first side and a second case portion rotationally connected to the first case portion;

a rotatable member rotationally connected to the first case portion and having a rotation side, said rotatable member for rotating between a storing position where the rotation side is located close to the first side and a using position where the rotation side is located away from the first side;

two cup holders, each cup holder having a holding portion and a guided portion integrally formed with the holding portion;

each of the two cup holders rotationally attached to the rotatable member such that each cup holder is rotatable about a rotation axis, each axis rotationally supporting each cup holder between the holding portion and the guided portion for allowing the cup holder to rotate in a direction perpendicular to a rotating direction of the rotatable member such that when the rotatable member is positioned at the storing position, the two cup holders are at least partially overlapped one upon the other;

a guiding device formed in the first case portion for guiding the guided portions, said guiding device having two cam surfaces provided in a central portion of the first case portion near the rotatable member, said cam surfaces facing away from each other and taper in an inward direction, each of said guided portions being urged to contact corresponding ones of the cam surfaces for guiding the cup holders to move close to and away from each other;

a first urging member fixed to the rotatable member for urging the rotatable member to rotate from the storing position to the using position; and a holding member for holding the rotatable member at the storing position and fixed to the first and second case portions so that when the rotatable member is rotated from the storing position to the using position by releasing the holding member, each of the guided portions is guided along each of the corresponding cam surfaces and the holding portions of the two cup holders overlapped one upon the other are separated from each other.

9. The cup holding device according to claim 8 wherein one of said first and second case portions is capable of being immovably fixed, and the other of said first and second case portion being rotatable in a direction parallel to the rotating direction of the rotatable member and having a supporting point spaced apart from a supporting point of said rotatable member with wherein each of the supporting points is located at a predetermined distance away from each other.

10. The cup holding device according to claim 9, further comprising a second urging member provided between the two cup holders, said second urging member urging each of the guided portions to contact the corresponding cam surfaces and urging said holding portions to separate from each other.

11. The cup holding device according to claim 9, wherein said first case portion includes a storing portion for storing the cup holders when the rotatable member is in the storing position, said second case portion covering the storing portion of the first case portion in the storing position.

* * * * *